United States Patent [19]
Santos et al.

[11] Patent Number: 5,442,313
[45] Date of Patent: Aug. 15, 1995

[54] RESOLUTION MULTIPLYING CIRCUIT

[75] Inventors: A. John Santos, Farmington; Mark E. LaCroix, New Hartford, both of Conn.

[73] Assignee: The Torrington Company, Torrington, Conn.

[21] Appl. No.: 250,190

[22] Filed: May 27, 1994

[51] Int. Cl.6 .................. G06G 7/12; H03K 12/00; G01R 19/00
[52] U.S. Cl. .................. 327/355; 327/104; 327/184; 327/62; 327/75
[58] Field of Search .................. 327/355–361, 327/104, 184, 50, 58, 60, 62, 72, 74, 75, 76, 24, 2, 3, 91, 94, 96, 63

[56] References Cited

U.S. PATENT DOCUMENTS

| | | | |
|---|---|---|---|
| 3,753,133 | 8/1973 | Shumate, Jr. | 328/151 |
| 4,415,856 | 11/1983 | Welles | 324/208 |
| 4,422,041 | 12/1983 | Lienau | 324/207 |
| 4,496,935 | 1/1985 | Inoue et al. | 340/347 |
| 4,535,294 | 8/1985 | Ericksen et al. | 328/150 |
| 4,733,177 | 3/1988 | Pawletko | 324/207 |
| 4,827,191 | 5/1989 | Chapman | 341/132 |
| 4,855,744 | 8/1989 | Sayers | 341/116 |
| 5,003,196 | 3/1991 | Kawaguchi | 307/290 |
| 5,012,239 | 4/1991 | Griebeler | 341/15 |
| 5,025,251 | 6/1991 | Mittel et al. | 340/825.44 |
| 5,050,190 | 9/1991 | Shimada et al. | 375/76 |
| 5,067,089 | 11/1991 | Ishii et al. | 364/486 |
| 5,107,213 | 4/1992 | Ponticelli et al. | 324/207.25 |

Primary Examiner—Timothy P. Callahan
Assistant Examiner—Toan Tran
Attorney, Agent, or Firm—John C. Bigler

[57] ABSTRACT

Peak and valley voltages of signals from at least two analog sensors are held by the circuit. A plurality of threshold voltages is generated from the previous peak and valley voltages of the respective analog sensors. The signal of each sensor is compared to the respective threshold voltages to produce a sequences of output transitions for each sensor. The output transitions are combined such that each sequence of output transitions from each analog sensor occurs between sequences of the other analog sensor (or sensors). An optional peak and valley reset is also disclosed.

13 Claims, 3 Drawing Sheets

RESOLUTION MULTIPLYING CIRCUIT

BACKGROUND OF THE INVENTION

This invention relates generally to resolution enhancement circuits and, more particularly, to circuits for multiplying the resolution of output signals from speed and displacement sensors.

Traditionally, increased resolution with speed or displacement sensors has been achieved by mechanical multiplication. For example, if magnetic poles and digital Hall-effect sensors are used to produce data points, additional magnetic poles or sensors may be added between initial magnetic poles or sensors to achieve closer spacing between data points. Such increased resolution is limited by space requirements for the additional poles and sensors and by the associated costs of the additional components.

In addition to problems related to space requirements and cost, inherent drifting of the switch points of the digital sensors results in inaccuracy of the sensing system, particularly since all the sensors may not drift the same way with respect to time, temperature, and other conditions. Variations in air gap, sensor gain, signal amplitude, and bias of the magnetic field during operation may also reduce the accuracy of the sensing system.

Another known method to increase resolution with speed or displacement sensors is to compare signals from two or more sensors to produce intermediate data points electronically. For example, when two sensors are positioned to produce signals that are 90 degrees out of phase, the signals may be combined in various percentages to provide additional data points by interpolation. However, the intermediate points will not be placed accurately if the signals of the two sensors do not drift the same way.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a resolution multiplying circuit for use with a plurality of analog sensors having a predetermined electrical degree separation. Peak hold means hold previous peak voltages of signals from the respective analog sensors, and valley hold means hold previous valley voltages of signals from the respective analog sensors. Threshold generating means generate a plurality of threshold voltages from the previous peak and valley voltages of the respective analog sensors. Voltage comparing means independently compare the signals from the analog sensors to the respective threshold voltages to produce sequences of output transitions. Combining means combine the output transitions such that each sequence of output transitions from each analog sensor occurs between sequences of the other analog sensors.

In another aspect of the invention, an optional peak and valley hold reset circuit is provided.

The foregoing and other aspects will become apparent from the following detailed description of the invention when considered with the accompanying drawing figures.

BRIEF DESCRIPTION OF THE DRAWING FIGURES

DETAILED DESCRIPTION

Figure 1:
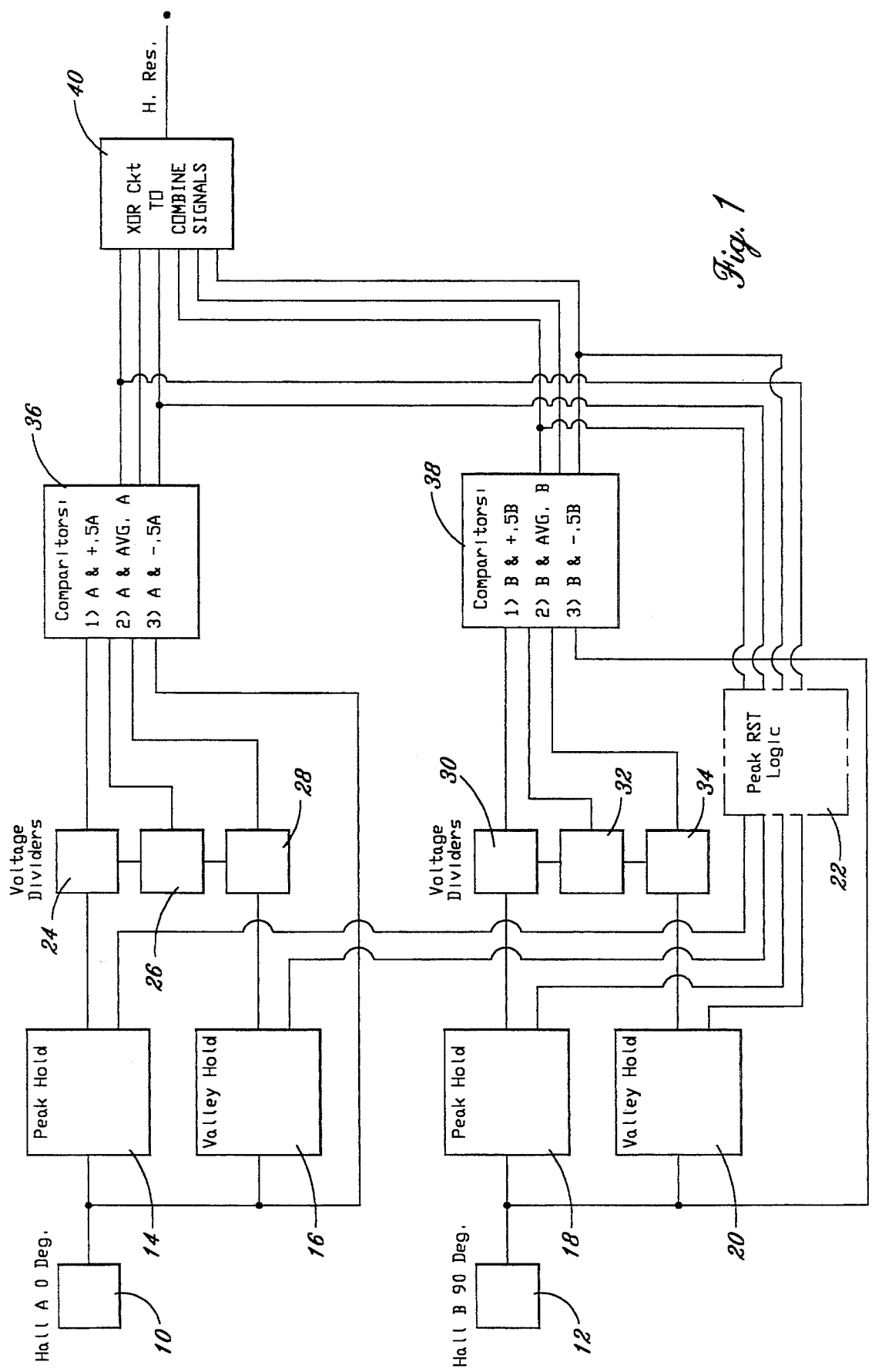
FIG. 1 is a block diagram illustrating one embodiment of the present invention with optional peak reset logic indicated in phantom.

Referring now to the drawings, the block diagram of FIG. 1 illustrates two analog sensors 10 and 12, for example Hall-effect sensors, that are positioned at a predetermined electrical degree separation. In the block diagram, the predetermined electrical separation is 90 degrees and analog sensors 10 and 12 are labeled as Hall A and Hall B, respectively. Other types of analog sensors and positioning may be used with similar effect.

Figure 2:
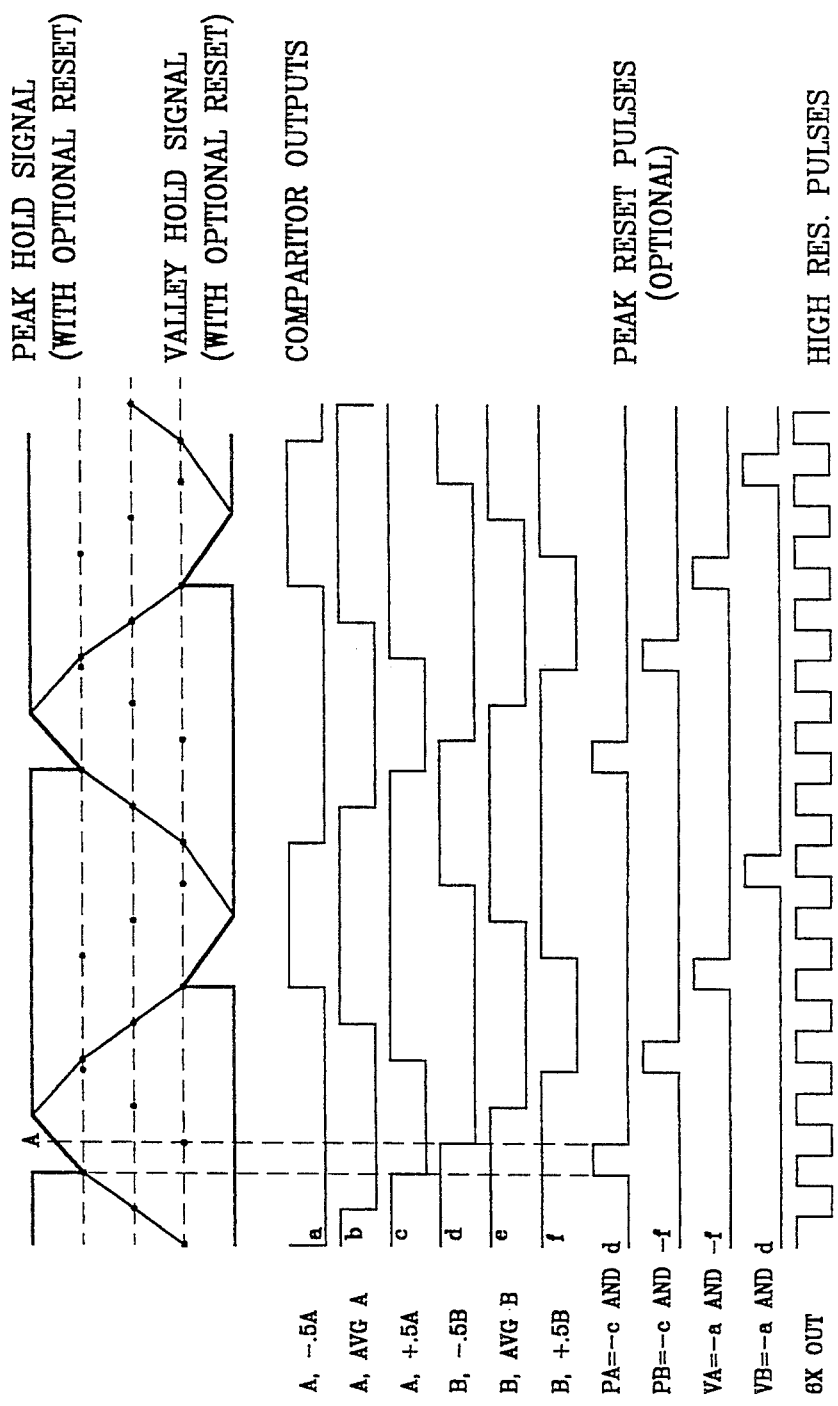
FIG. 2 is a graph of timing wave forms corresponding to the block diagram of FIG. 1.

Signals of analog sensors 10 and 12 may be, for example, sine waves A and B with 90 degree phase angle, as shown at the top of FIG. 2. Peak hold means 14 and valley hold means 16 sense previous peak and valley voltages, respectively, of signal A and hold those voltages as reference values. Similarly, peak hold means 18 and valley hold means 20 sense previous peak and valley voltages, respectively, of signal B and hold those voltages as reference values.

Optional peak reset logic 22 may be used to discharge the reference voltages before the end of each period (as shown in FIG. 2) to allow the peak and valley reference voltages to be reset. Although not required for the practice of the present invention, peak reset logic 22 may be added to provide constant compensation for changes in gain or amplitude of signal A and signal B, thereby increasing the accuracy of the sensing system when the voltage of signal A or signal B drifts up or down.

Voltage dividing means 24, 26 and 28 divide the reference voltages of signal A to provide threshold voltages at the average of the peak and valley voltages of signal A, at midway between that average and the peak voltage, and at midway between that average and the valley voltage. Similarly, voltage dividing means 30, 32 and 34 provide threshold voltages at the average of the peak and valley voltages of signal B, at midway between that average and the peak voltage, and at midway between that average and the valley voltage.

The threshold voltages generated from signal A are applied to comparators 36 to produce outputs a, b and c shown in FIG. 2. Similarly, the threshold voltages generated from signal B are applied to comparators 38 to produce outputs d, e and f. Exclusive OR circuit 40 combines the outputs of comparators 36 and 38 to produce the high resolution output shown at the bottom of FIG. 2, having six times the resolution of analog sensor 10 without the benefit of the present invention.

Optional peak reset logic 22 combines the outputs of comparators 36 and 38 to produce peak reset pulses PA, PB, VA and VB shown in FIG. 2. For example, peak reset pulses PA, PB, VA and VB may correspond to a logical ANDing of inverted c AND d, inverted c AND inverted f, a AND inverted f, and a AND d, respectively, to discharge the peak and valley reference voltages at the time when they are last needed prior to new peak and valley voltages. Alternatively, the discharge point may be set at a later point, closer to the following peak or valley.

Anticipated peak hold voltage on capacitor 50 is held as feedback on the inverting input of amplifier 44 through voltage follower 48 and resistor 62. When the signal from analog sensor 10 is presented to the non-inverting input of amplifier 44 through resistor 42, the output of amplifier 44 charges capacitor 50 through diode 46 so that the capacitor-charged voltage is never below the input sensor voltage. Diode 46 allows only charging of capacitor 50 so that peaks are held.

Anticipated valley hold voltage on capacitor 60 is held as feedback on the inverting input of amplifier 54 through voltage follower 58 and resistor 64. When the signal from analog sensor 10 is presented to the non-inverting input of amplifier 54 through resistor 52, the output of amplifier 54 charges capacitor 60 through diode 56 so that the capacitor-charged voltage is never above the input sensor voltage. Diode 56 allows only charging of capacitor 60 so that valleys are held.

Voltage divider means 24, 26 and 28 comprise four precision one percent 1K resistors 66, 68, 70 and 72, connected in series. An output between resistors 68 and 70 is the average of (halfway between) the reference voltages of peak hold means 14 and valley hold means 16 and is applied to comparator 76. An output between resistors 66 and 68 is midway between that average and the reference voltage of peak hold means 14 and is applied to comparator 74. An output between resistors 70 and 72 is midway between that average and the reference voltage of valley hold means 16 and is applied to comparator 78.

Signal A is applied to the other input of comparators 74, 76 and 78 through 1K resistors 80, 82 and 84, respectively. Hysteresis feedback resistors 86, 88 and 90, with values of 120K, 100K and 120K, respectively, and 10K pull-up resistors 92, 94 and 96 complete the components of comparators 36 of FIG. 1. The output of comparator 74 is shown as output c of FIG. 2, the output of comparator 76 as output b of FIG. 2, and the output of comparator 78 as output a of FIG. 2.

Signal B from analog sensor 12 is processed independently in a manner similar to that just described with respect to signal A. Anticipated peak hold voltage on capacitor 106 is held as feedback on the inverting input of amplifier 100 through voltage follower 104 and resistor 118. When the signal from analog sensor 12 is presented to the non-inverting input of amplifier 100 through resistor 98, the output of amplifier 100 charges capacitor 106 through diode 102 so that the capacitor-charged voltage is never below the input sensor voltage. Diode 102 allows only charging of capacitor 106 so that peaks are held.

Anticipated valley hold voltage on capacitor 116 is held as feedback on the inverting input of amplifier 110 through voltage follower 114 and resistor 120. When the signal from analog sensor 12 is presented to the non-inverting input of amplifier 110 through resistor 108, the output of amplifier 110 charges capacitor 116 through diode 112 so that the capacitor-charged voltage is never above the input sensor voltage. Diode 112 allows only charging of capacitor 106 so that valleys are held.

Voltage divider means 30, 32 and 34 comprise four precision one percent 1K resistors 122, 124, 126 and 128, connected in series. An output between resistors 124 and 126 is the average of the reference voltages of peak hold means 18 and valley hold means 20 and is applied to comparator 132. An output between resistors 122 and 124 is midway between that average and the reference voltage of peak hold means 18 and is applied to comparator 130. An output between resistors 126 and 128 is midway between that average and the reference voltage of valley hold means 20 and is applied to comparator 134.

Signal B is applied to the other input of comparators 130, 132 and 134 through 1K resistors 136, 138 and 140, respectively. Hysteresis feedback resistors 142, 144 and 146, with values of 120K, 100K and 120K, respectively, and 10K pull-up resistors 148, 150 and 152 complete the components of comparators 38 of FIG. 1. The output of comparator 130 is shown as output f of FIG. 2, the output of comparator 132 as output e of FIG. 2, and the output of comparator 134 as output d of FIG. 2.

Outputs a and c are applied to exclusive OR 154, outputs d and f are applied to exclusive OR 156, and outputs b and e are applied to exclusive OR 158. The outputs of exclusive OR 154 and exclusive OR 156 are applied to exclusive OR 160, and the outputs of exclusive OR 158 and exclusive 160 are applied to exclusive OR 162. The output of exclusive OR 162 is the desired high resolution output.

Optional peak reset logic 22 comprises exclusive OR 164 and exclusive OR 166 that invert outputs a and d, respectively, and AND gates 168, 170, 172 and 174. The output of exclusive OR 164 and output d are logically ANDed by AND gate 168 to produce reset pulse VA. The outputs of exclusive OR 164 and exclusive OR 166 are ANDed by AND gate 170 to produce reset pulse VB. The output of exclusive OR 166 and output a are ANDed by AND gate 172 to produce reset pulse PA. And, outputs c and d are ANDed by AND gate 174 to produce reset pulse PB.

Reset pulses VA, VB, PA and PB are applied to analog switches 176, 178, 180 and 182, respectively. As shown in FIG. 2, the reset pulses cause the switches to charge or discharge the appropriate capacitor to equal the voltage of either signal A or signal B.

Resistors 66, 68, 70 and 72 of equal value are selected to correspond to the illustrated sine wave shape of signals A and B, described, to produce data points that are evenly spaced in time. That is, the three threshold voltages produce output transitions at 0, 30, 150, 180, 210 and 330 electrical degrees. Resistors 122, 124, 126 and 128 result in output transitions at 60, 90, 120, 240, 270 and 300. When signals A and B have a different shape, the relative values of those resistors may be adjusted to ensure that the resulting data points are evenly spaced in time.

Significantly, signal A and signal B are processed independently such that the sequence of output transitions resulting from signal A occurs (in time) between sequences of output transitions from signal B. As a result, when signals A and B drift in gain or offset in an unequal or opposite manner, the output signal transitions remain equally spaced.

Figure 3:
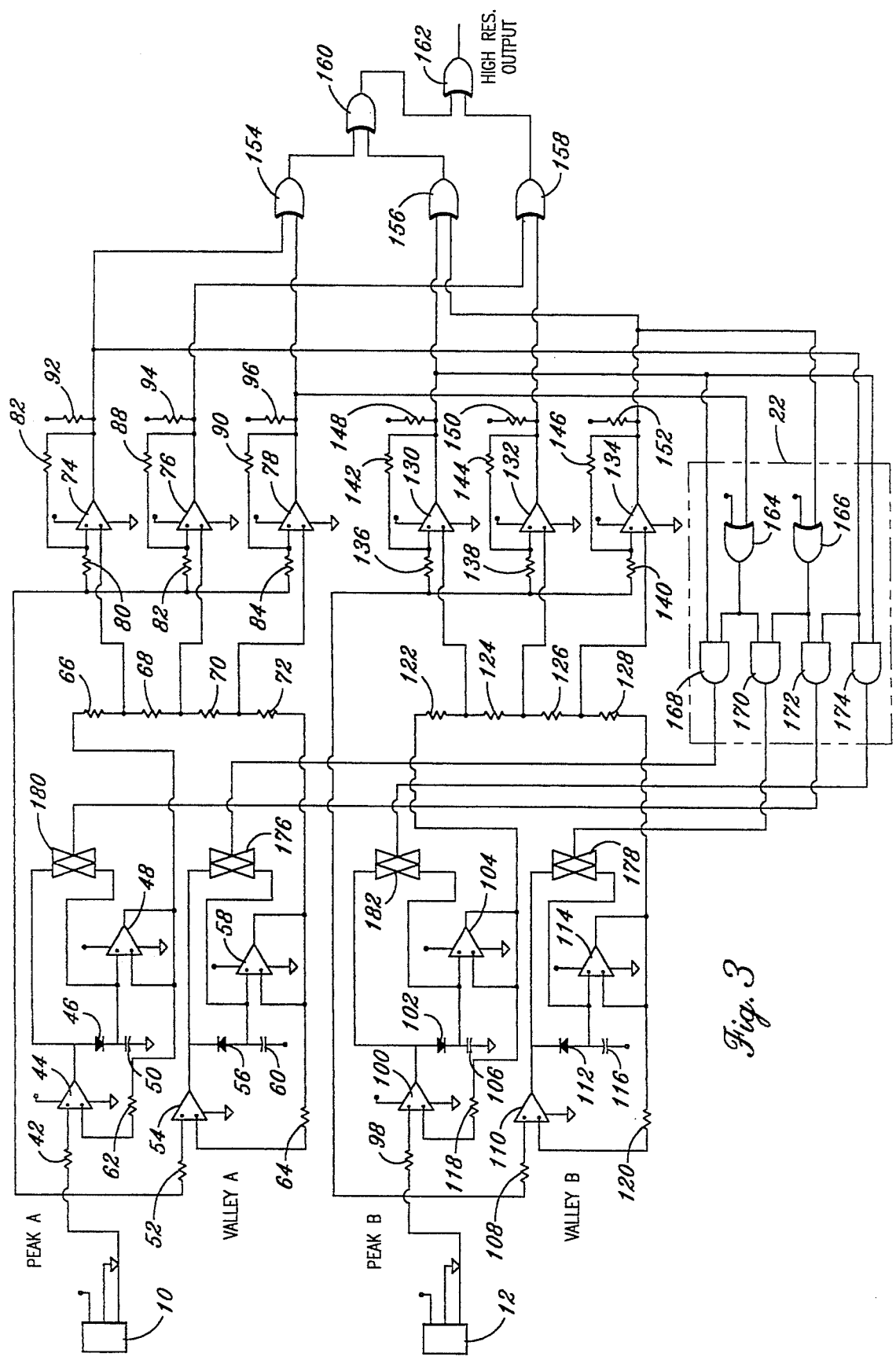
FIG. 3 is a schematic diagram illustrating an application specific circuit corresponding to the block diagram of FIG. 1.

In the particular application shown in FIG. 3, suitable analog sensors 10 and 12 may be of the Hall-effect type, for example, with output signals of 0.5 to 4.0 volts peak-to-peak, and capacitors 50, 60, 106 and 116 may each have a value of 3.3 microfarads. Amplifiers 44, 54, 100 and 110 and voltage followers 48, 58, 104 and 114 may be provided on standard LM324 circuits; switches 176, 178, 180 and 182 may be provided by a standard CD4016 circuit; and comparators 74, 76, 78, 130, 132 and 134 may be provided by standard LM339 circuits. Those components are readily available from National Semiconductor Corporation of Santa Clara, Calif., and from other sources.

Instead of generating three threshold voltages, the resolution multiplying circuit of the present invention may generate two, four or another number of threshold voltages by dividing the previous peak and valley voltages and holding those values for comparison with the signal from the respective analog sensor. If only two threshold voltages are used, for example, the two analog sensors would provide four times the initial resolution. If four threshold voltages are used, the two analog sensors would provide eight times the initial resolution.

The number of analog sensors is not limited to the two analog sensors illustrated in FIGS. 1 through 3. For example, three analog sensors may be used with a predetermined electrical degree separation of 60 electrical degrees. More generally, the electrical degree separation may be represented as 180/N plus 180 n, where N is the number of analog sensors and n is an integer or zero. Thus, any number of analog sensors may be distributed along the signal path to effect the present invention. The signal path may be annular, as with a rotating magnetic encoder ring, or may be linear.

The output transitions produced by the particular embodiment illustrated in FIG. 3, with three threshold voltages generated from two analog sensors at 90 electrical degrees separation, occur at 0, 30, 150, 180, 210 and 330 electrical degrees. If two threshold voltages are generated from two analog sensors at 90 electrical degrees separation, the output transitions occur at 22.5, 157.5, 202.5 and 337.5 electrical degrees. Other output transitions are produced if additional analog sensors and threshold voltages are used.

From the above, it will be apparent that the present invention provides a multiplication of resolution of output signals from speed and displacement sensors without use of additional magnetic poles or sensors. Because analog sensors are used, problems inherent with drifting of digital sensor switch points are avoided. Even if the gain or amplitude of signals from the sensors drift with respect to each other, the present invention provides constant compensation to ensure an accurate indication of speed or displacement.

Having described the invention, what is claimed is:

1. A resolution multiplying circuit for use with first and second analog sensors having 90 electrical degrees separation, the circuit comprising:
    first and second peak hold means, for holding a previous peak voltage of signals from the first and second analog sensors, respectively;
    first and second valley hold means, for holding a previous valley voltage of the signals from the first and second analog sensors, respectively;
    first and second threshold generating means, for independently generating a plurality of threshold voltages from the held previous peak and valley voltages of the first and second analog sensors, respectively;
    voltage comparing means, for independently comparing the signals from the first and second analog sensors to the threshold voltages of the respective threshold generating means to produce sequences of output transitions; and
    combining means, for combining the output transitions such that each sequence of output transitions from the first analog sensor occurs between sequences of output transitions from the second analog sensor.

2. The resolution multiplying circuit according to claim 1, wherein each threshold generating means produces three threshold voltages, one at the average of the previous peak and valley voltages of the signal from the respective analog sensor, one at half way between that average and the respective previous peak voltage, and one at half way between the average and the respective previous valley voltage.

3. The resolution multiplying circuit according to claim 1, wherein each threshold generating means produces two threshold voltages, one at the average of the previous peak and valley voltages of the signal from the respective analog sensor plus 38 percent of the difference between that average and the respective previous peak voltage, and the other at that average less 38 percent of the difference between that average and the respective previous valley voltage.

4. The resolution multiplying circuit according to claim 1, further comprising reset means for discharging the first and second peak hold means and the first and second valley hold means after the threshold voltages are generated and for setting new peak and valley voltages.

5. A resolution multiplying circuit for use with a plurality of analog sensors having a predetermined electrical degree separation, the circuit comprising:
    a plurality of peak hold means, each peak hold means for holding a previous peak voltage of a signal from the respective analog sensor;
    a plurality of valley hold means, each valley hold means for holding a previous valley voltage of a signal from the respective analog sensor;
    threshold generating means, for independently generating a plurality of threshold voltages from the held previous peak and valley voltages of the respective analog sensors;
    voltage comparing means, for independently comparing the signals from the analog sensors to the respective threshold voltages to produce sequences of output transitions; and
    combining means, for combining the output transitions such that each sequence of output transitions from each analog sensor occurs between sequences of the other analog sensors.

6. The resolution multiplying circuit according to claim 5, wherein the predetermined electrical degree separation of the analog sensors is a function of the number of analog sensors, the electrical degree separation being represented by $$180/N + 180n$$

where N is the number of analog sensors and n is an integer or zero.

7. The resolution multiplying circuit according to claim 5, wherein the number of analog sensors is three and the predetermined electrical degree separation of the analog sensors is 60 electrical degrees.

8. The resolution multiplying circuit according to claim 5, wherein the number of analog sensors is two and the predetermined electrical degree separation of the analog sensors is 90 electrical degrees.

9. The resolution multiplying circuit according to claim 5, further comprising reset means for discharging the first and second peak hold means and the first and second valley hold means after the threshold voltages are generated and for setting new peak and valley voltages.

10. A resolution multiplying circuit for use with first and second analog sensors having 90 electrical degrees separation, the circuit comprising:

first peak hold means, for holding a previous peak voltage of a signal from the first analog sensor;

first valley hold means, for holding a previous valley voltage of the signal from the first analog sensor;

first threshold generating means, for generating three threshold voltages at the average of the held previous peak and valley voltages of the first analog sensor, at midway between that average and the previous peak voltage, and at midway between that average and the previous valley voltage;

first voltage comparing means, for comparing the signal from the first analog sensor to the three threshold voltages to produce output transitions at 0, 30, 150, 180, 210 and 330 electrical degrees;

second peak hold means, for holding a previous peak voltage of a signal from the second analog sensor;

second valley hold means, for holding a previous valley voltage of the signal from the second analog sensor;

second threshold generating means, for generating three threshold voltages at the average of the held previous peak and valley voltages of the second analog sensor, at midway between that average and the previous peak voltage, and at midway between that average and the previous valley voltage;

second voltage comparing means, for comparing the signal from the second analog sensor to the three threshold voltages to produce output transitions at 60, 90, 120, 240, 270 and 300 electrical degrees; and combining means, for combining the output transitions of the first and second voltage comparing means such that an output signal is produced with output transitions at 0, 30, 60, 90, 120, 150, 180, 210, 240, 270, 300, and 330 electrical degrees.

11. The resolution multiplying circuit according to claim 10, further comprising reset means for discharging the first and second peak hold means and the first and second valley hold means after the threshold voltages are generated and for setting new peak and valley voltages.

12. A resolution multiplying circuit for use with first and second analog sensors having 90 electrical degrees separation, the circuit comprising:

first peak hold means, for holding a previous peak voltage of a signal from the first analog sensor;

first valley hold means, for holding a previous valley voltage of the signal from the first analog sensor;

first threshold generating means, for generating two threshold voltages at the average of the held previous peak and valley voltages of the first analog sensor plus 38 percent of the difference between that average and the previous peak voltage of the first analog sensor, and at that average less 38 percent of the difference between that average and the previous valley voltage of the first analog sensor;

first voltage comparing means, for comparing the signal from the first analog sensor to the two threshold voltages to produce output transitions at 22.5, 157.5, 202.5, and 337.5 electrical degrees;

second peak hold means, for holding a previous peak voltage of a signal from the second analog sensor;

second valley hold means, for holding a previous valley voltage of the signal from the second analog sensor;

second threshold generating means, for generating two threshold voltages at the average of the held previous peak and valley voltages of the second analog sensor plus 38 percent of the difference between that average and the previous peak voltage of the second analog sensor, and at that average less 38 percent of the difference between that average and the previous valley voltage of the second analog sensor;

second voltage comparing means, for comparing the signal from the second analog sensor to the two threshold voltages to produce output transitions at 67.5, 112.5, 247.5, and 292.5 electrical degrees; and combining means, for combining the output transitions of the first and second voltage comparing means such that an output signal is produced with output transitions at 22.5, 67.5, 112.5, 157.5, 202.5, 247.5, 292.5, and 337.5 electrical degrees.

13. The resolution multiplying circuit according to claim 12, further comprising reset means for discharging the first and second peak hold means and the first and second valley hold means after the threshold voltages are generated and for setting new peak and valley voltages.

* * * * *